(12) United States Patent
Pai et al.

(10) Patent No.: US 10,664,117 B1
(45) Date of Patent: May 26, 2020

(54) COMPOSITE TRANSPARENT TOUCH PANEL

(71) Applicants: Chih-Chiang Pai, Taoyuan (TW);
Meng-Kuei Lin, Taoyuan (TW);
Hung-Chi Huang, Taoyuan (TW);
Chiu-Wen Chen, Taoyuan (TW)

(72) Inventors: Chih-Chiang Pai, Taoyuan (TW);
Meng-Kuei Lin, Taoyuan (TW);
Hung-Chi Huang, Taoyuan (TW);
Chiu-Wen Chen, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 16/362,649

(22) Filed: Mar. 24, 2019

(51) Int. Cl.
*G06F 3/044* (2006.01)
*G06F 3/046* (2006.01)

(52) U.S. Cl.
CPC ............ *G06F 3/046* (2013.01); *G06F 3/0445* (2019.05); *G06F 2203/04104* (2013.01)

(58) Field of Classification Search
CPC ......... G06F 3/046; G06F 3/0445; G06F 3/044
See application file for complete search history.

(56) References Cited

U.S. PATENT DOCUMENTS

| | | | |
|---|---|---|---|
| 2016/0139701 A1* | 5/2016 | Wang | G06F 3/046 345/174 |
| 2016/0179266 A1* | 6/2016 | Yang | G06F 3/044 345/174 |

* cited by examiner

*Primary Examiner* — Alexander Eisen
*Assistant Examiner* — Cory A Almeida (57) ABSTRACT

A touch panel includes a base layer having a shaded area and a visible area; a first sensing layer having first capacitive sensing columns (FCSCs) and first electromagnetic antenna columns (FEACs), which are insulated; a first auxiliary conductive layer having a circuit pattern substantially identical to the first sensing layer, and the circuit pattern correspondingly electrically connecting to the first sensing layer; a second sensing layer having second capacitive sensing columns (SCSCs) and second electromagnetic antenna columns (SEACs), which are insulated; a second auxiliary conductive layer having a circuit pattern substantially identical to the second sensing layer, and the circuit pattern correspondingly connect to the second sensing layer; and an insulative layer between the first and second sensing layer. The FCSCs are orthogonal to the SCSCs to constitute a diamond-lattice-shaped capacitive sensing unit array, and the FEACs are orthogonal to the SEACs to constitute a diamond-lattice-shaped electromagnetic antenna array.

8 Claims, 11 Drawing Sheets

COMPOSITE TRANSPARENT TOUCH PANEL

TECHNICAL FIELD

The invention relates to a transparent touch panel mounted on a display, particularly to a transparent touch panel with both capacitive and electromagnetic touch sensing functions.

RELATED ART

Current capacitive touch sensors are usually made of transparent and conductive indium tin oxide (ITO) material. They can be mounted on displays because of their transparency. X/Y axes antenna arrays of current electromagnetic touch sensors utilize metal material. Because metal wires would resist light, such a type of touch sensors is usually mounted under displays to prevent visibility of the displays from being attenuated.

Furthermore, capacitive sensing electrodes and their signal paths of a current transparent capacitive touch sensor are made by etching an ITO film form a touch sensing circuit pattern, so there are both an electrode portion formed by conductive material and a scraped portion formed by removing conductive material. The electrode portion and the scraped portion have different transmittance to cause unevenness of refraction of light penetrating through the ITO film. This will result in obvious pattern or grain when a user is viewing the display. Particularly, when the touch sensor is mounted on a display, deformation, vague or distortion of images will occur. Besides, with more and more precision development of electronic products, touch sensing electrodes and signal paths of a touch sensor become narrower and narrower in size. However, narrowed electrodes and signal paths will increase impedance to attenuate signals. Especially for the applications of large-sized touch panels, conductivity of ITO films has been hard to satisfy requirements.

On the other hand, because induction coils or antenna arrays of electromagnetic touch sensors must have low impedance and general ITO films cannot satisfy this requirement, they are usually made by metal wires or films with high conductivity. However, metal wires cannot allow light to penetrate, a shading effect and an optical interference pattern (Moire) will occur when they are arranged in front of a display. This affects image quality seriously. As a result, such metal wires can only be used on the back of a display. This will increase thickness of overall display module and be adverse to the requirement of compactness. Also, when an electromagnetic pen is used on an electromagnetic touch sensor under a display panel, a problem of inputting accuracy degradation of the electromagnetic pen used at edges of the image will occur. Therefore, how to make an electromagnetic touch sensor have low impedance to be capable of being arranged in front of a display without attenuating visibility of an image shown on the display is a serious issue to be solved.

SUMMARY OF THE INVENTION

An object of the invention is to provide an improved composite transparent touch panel, which has both capacitive and electromagnetic touch sensing modes to provide two touch input manners. Such a multiple touch input function is advantageous to development and application of new application software.

Another object of the invention is to provide an improved composite transparent touch panel, which has uniform transmittance to be capable of being mounted in front of a display with keeping visibility of an image shown on the display.

Still another object of the invention is to provide an improved composite transparent touch panel, which can improve conductive efficiency of touch signals to be advantageous to design and application of large-sized touch panels.

To accomplish the above objects, the invention provides an improved composite transparent touch panel, which includes:

a base layer, having a colored bezel on a periphery of a side thereof, and the colored bezel defining a shaded area and a visible area surrounded by the shaded area;

a first sensing layer, having first capacitive sensing columns and first electromagnetic antenna columns, the first capacitive sensing columns and the first electromagnetic antenna columns being arranged along a first direction and separately insulatively interlaced with each other to form a first circuit pattern, a first end of each of the first capacitive sensing columns being provided with a first capacitive signal contact, a first end of each of the first electromagnetic antenna columns being provided with a first electromagnetic signal contact, a second end of each of the first electromagnetic antenna columns being connected to a first connecting wire, the first connecting wires electrically connecting the first electromagnetic antenna columns in series, the first circuit pattern being located in the visible area, and the first capacitive signal contacts, the first electromagnetic signal contacts and the first connecting wires are located in the shaded area;

a first auxiliary conductive layer, having a first mirroring pattern substantially identical to the first circuit pattern except the first electromagnetic signal contacts and the first electromagnetic signal contacts so as to make the first mirroring pattern correspondingly electrically connect to the first circuit pattern, and a first gap being formed between each first capacitive signal contact and a corresponding one of the first electromagnetic signal contacts, wherein a width of the first gap is above 200 μm;

a second sensing layer, having second capacitive sensing columns and second electromagnetic antenna columns, the second capacitive sensing columns and the second electromagnetic antenna columns being arranged along a second direction and separately insulatively interlaced with each other to form a second circuit pattern, a first end of each of the second capacitive sensing columns being provided with a second capacitive signal contact, a first end of each of the second electromagnetic antenna columns being provided with a second electromagnetic signal contact, a second end of each of the second electromagnetic antenna columns being connected to a second connecting wire, the second connecting wires electrically connecting the second electromagnetic antenna columns in series, the second circuit pattern being located in the visible area, and the second capacitive signal contacts, the second electromagnetic signal contacts and the second connecting wires are located in the shaded area;

a second auxiliary conductive layer, having a second mirroring pattern substantially identical to the second circuit pattern except the second electromagnetic signal contacts and the second electromagnetic signal contacts so as to make the second mirroring pattern correspondingly electrically connect to the second circuit pattern, and a second gap being formed between each second capacitive signal contact and a corresponding one of the second electromagnetic signal contacts, wherein a width of the second gap is above 200 µm; and an insulative layer disposed between the first sensing layer and the second sensing layer;

wherein the first direction is orthogonal to the second direction, the first capacitive sensing columns are orthogonal to the second capacitive sensing columns to constitute a rectangular-lattice-shaped array of diamond-shaped capacitive sensing units, the first electromagnetic antenna columns are orthogonal to the second electromagnetic antenna columns to constitute a rectangular-lattice-shaped electromagnetic antenna array, and each of the first capacitive signal contacts, the first electromagnetic signal contacts, the second capacitive signal contacts and the second electromagnetic signal contacts is connected to a signal wire, so that touch sensing signals captured by both the first sensing layer and the second sensing layer can be sent to an external signal processor through the signal wires.

Preferably, each of the first and second sensing layers is formed by a metal oxide film made of indium tin oxide (ITO), indium zinc oxide (IZO), aluminum zinc oxide (AZO) or antimony tin oxide (ATO).

Preferably, each of the first and second auxiliary layers is formed by a metal mesh or graphene film, and the metal mesh is woven by metal wires made of gold, silver, copper, aluminum, molybdenum or nickel, but not limited to these.

Preferably, the first circuit pattern further comprises a first insulative column between each first capacitive sensing column and a corresponding one of the first electromagnetic antenna columns, and the second circuit pattern further comprises a second insulative column between each second capacitive sensing column and a corresponding one of the second electromagnetic antenna columns, the first and second insulative columns are separately shaped into multiple discontinuous areas made of a conductive material, and the areas is a hexagon, triangle, rectangle, trapezoid, strip, polygon or circle in shape, but not limited to these.

Preferably, the insulative layer is made of solid optically clear adhesive (OCA) or liquid optical clear resin (OCR), but not limited to these.

DETAILED DESCRIPTION OF THE INVENTION

Preferred embodiments are depicted in the drawings. For the sake of clarity and readability, elements in the drawings are not shown in an exact proportion and size and the proportion of some elements are magnified in size. Irrelated details have been omitted for simplification.

Figure 1:
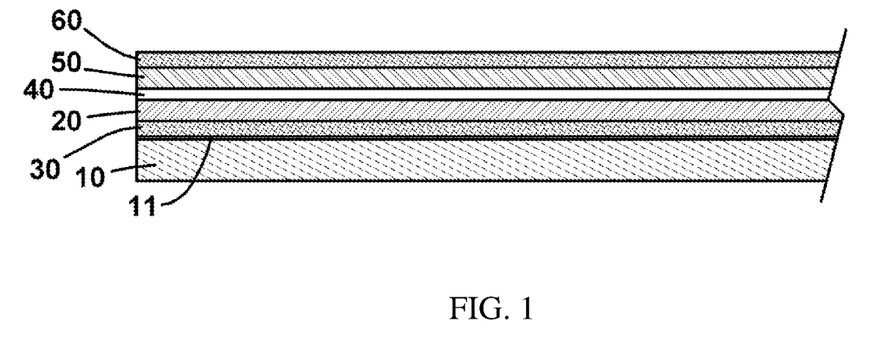
FIG. 1 is a cross-sectional view of a laminated structure of the invention.

As shown in FIG. 1, the composite transparent touch panel of the invention includes a base layer 10, a first sensing layer 20, a first auxiliary conductive layer 30, an insulative layer 40, a second sensing layer 50 and a second auxiliary conductive layer 60.

Figure 2:
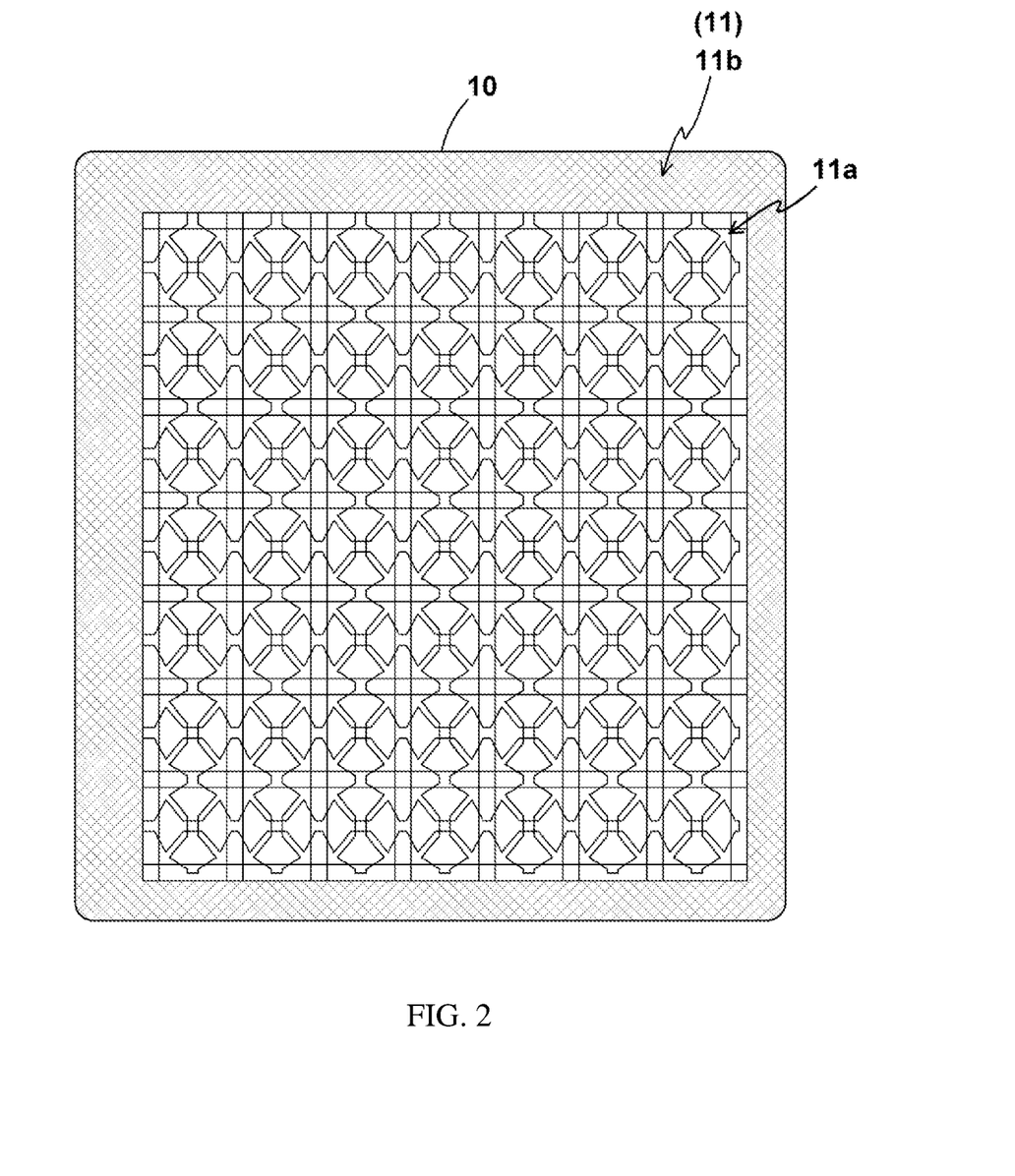
FIG. 2 is a top plan view of the invention.

As shown in FIGS. 1 and 2, the base layer 10 is a glass thin plate with high transmittance and great mechanic strength. A periphery of a side of the base layer 10 has a colored bezel 11 formed an insulative black matrix (BM) material. The colored bezel 11 defines a shaded area 11b and a visible area 11a surrounded by the shaded area 11b.

Figure 3:
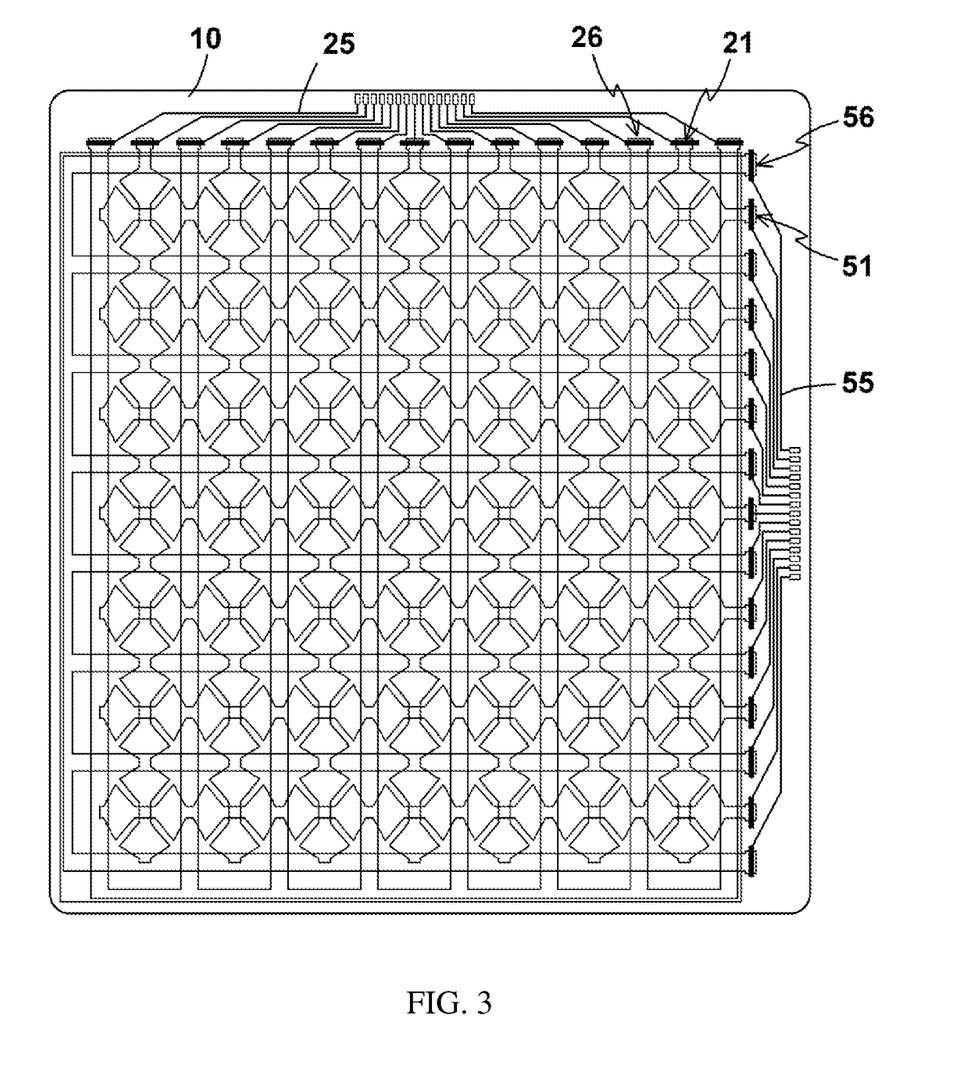
FIG. 3 is a back plan view of the invention.
Figure 4:
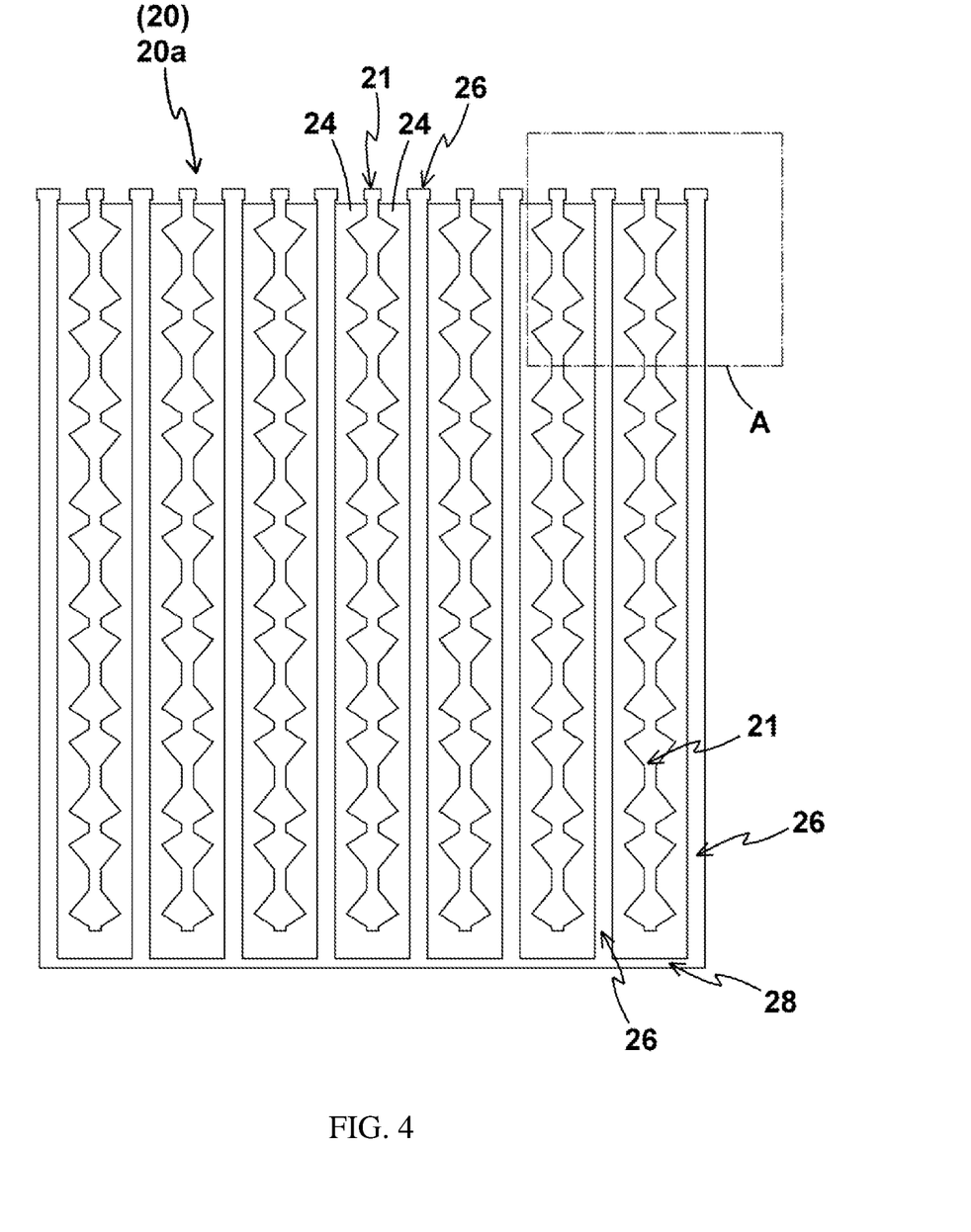
FIG. 4 is a plan view of the first sensing layer of the invention.
Figure 5:
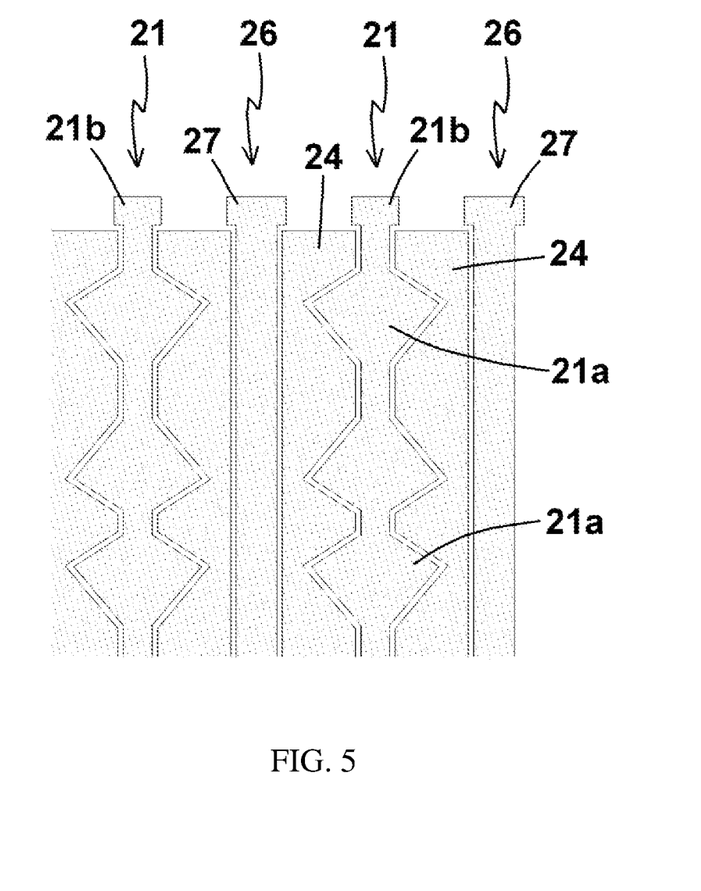
FIG. 5 is an enlarged view of part A in FIG. 4.

Please refer to FIGS. 2-5. The first sensing layer 20 (i.e., Y-axis sensing layer) is an ITO (indium tin oxide) conductive film and has first capacitive sensing columns (i.e., Y-axis sensing columns) 21, first insulative columns 24 and first electromagnetic antenna columns (i.e., Y-axis electromagnetic antenna columns) 26, all of which are arranged along a first direction (i.e., Y-axis direction). Each of the first insulative columns 24 is arranged between one of the first capacitive sensing columns 21 and one of the first electromagnetic antenna columns 26 to form a first circuit pattern 20a. As shown in FIG. 5, each of the first capacitive sensing columns 21 is composed of a string of diamond first capacitive sensing units 21a. An upper end of each of the first capacitive sensing columns 21 is provided with a first capacitive signal contact 21b. An upper end of each of the first electromagnetic antenna columns 26 is provided with a first electromagnetic signal contact 27 and a lower end of each of the first electromagnetic antenna columns 26 is connected to a first connecting wire 28. The first connecting wires 28 electrically connect each of the first electromagnetic antenna columns 26 in series. As shown in FIGS. 2 and 3, the first circuit pattern 20a is located in the visible area 11a, and the first capacitive signal contacts 21b, the first electromagnetic signal contacts 27 and the first connecting wires 28 are located in the shaded area 11b.

Please refer to FIGS. 3 and 6-9. The first auxiliary conductive layer 30 is a metal mesh layer and has a first mirroring pattern 30a substantially identical to the first circuit pattern 20a except the first electromagnetic signal contacts 21b and the first electromagnetic signal contacts 27. The first mirroring pattern 30a is correspondingly electrically connected to the first circuit pattern 20a. A gap D is formed between each first capacitive signal contact 21b and a corresponding one of the first electromagnetic signal contacts 27. Preferably, a width of the gap D is above 200 µm. When the first auxiliary conductive layer 30 is connected onto the first sensing layer 20, the gaps D makes edges of the first auxiliary conductive layer 30 be out of contact with both the first capacitive signal contacts 21b and the first electromagnetic signal contacts 27.

Figure 6:
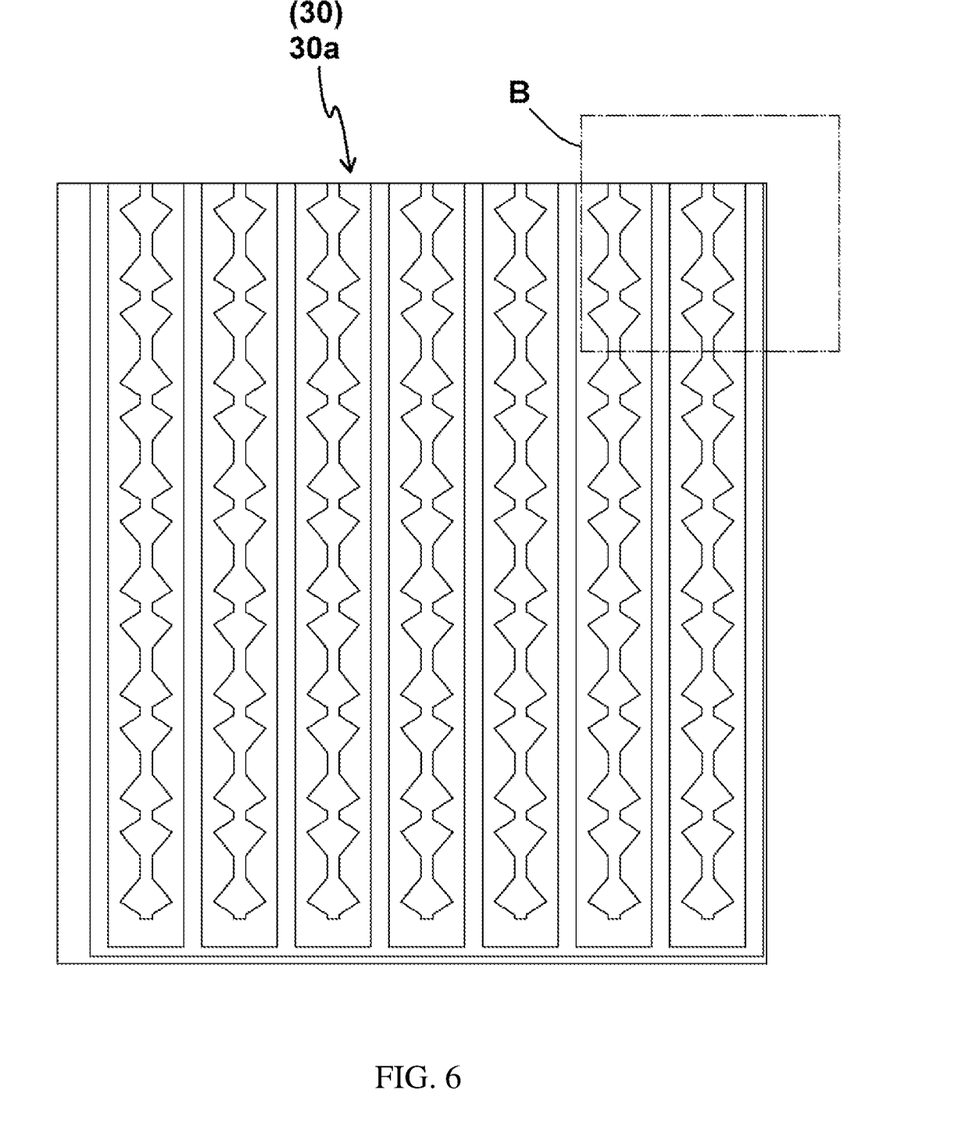
FIG. 6 is a plan view of the first auxiliary conductive layer of the invention.
Figure 7:
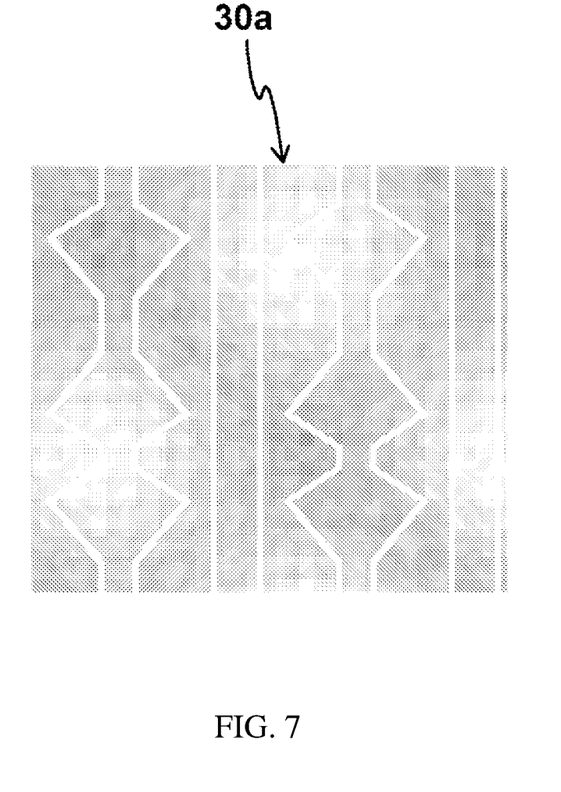
FIG. 7 is an enlarged view of part B in FIG. 6.
Figure 8:
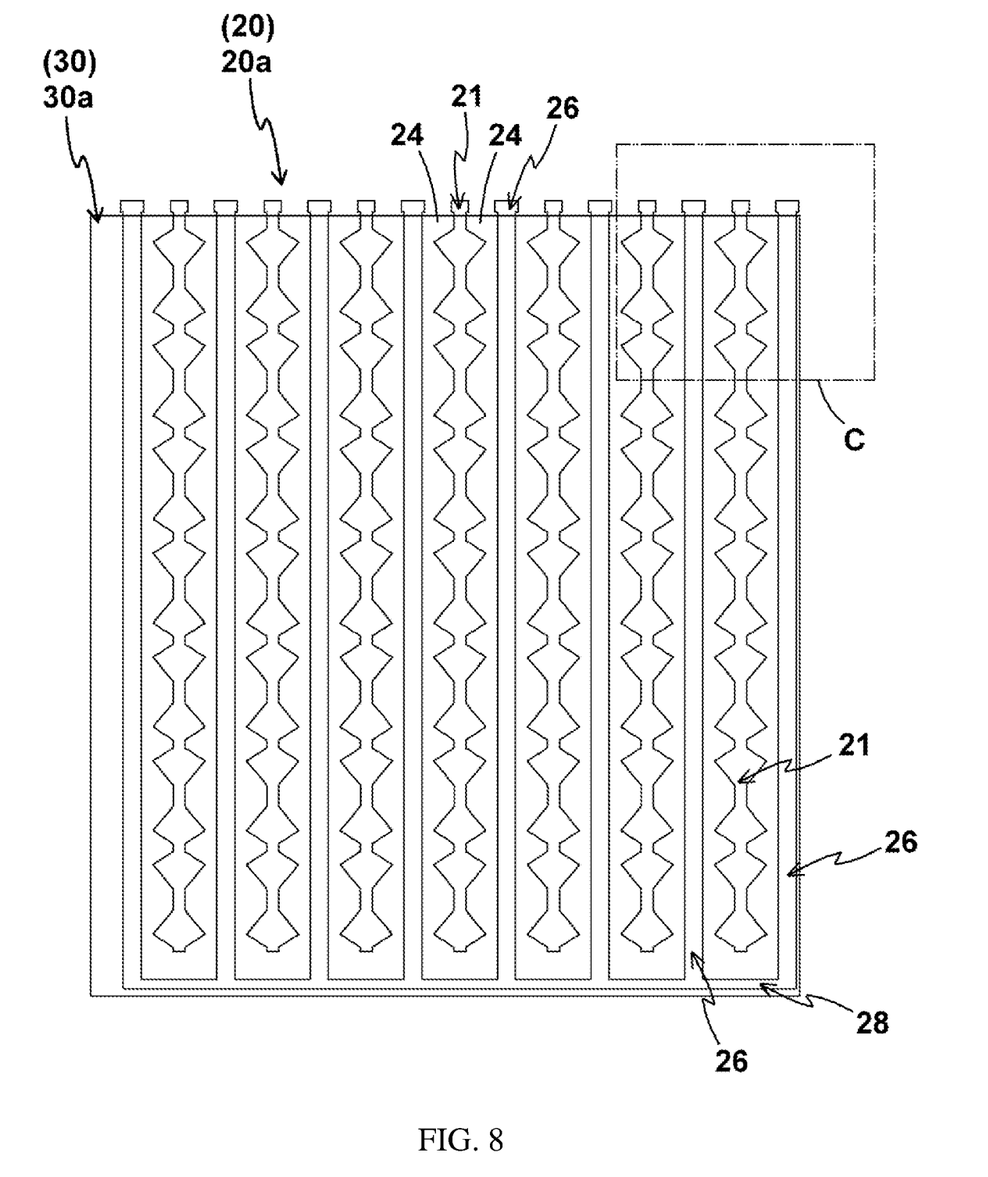
FIG. 8 is a plan view of the first auxiliary conductive layer superposed on the first sensing layer of the invention.
Figure 9:
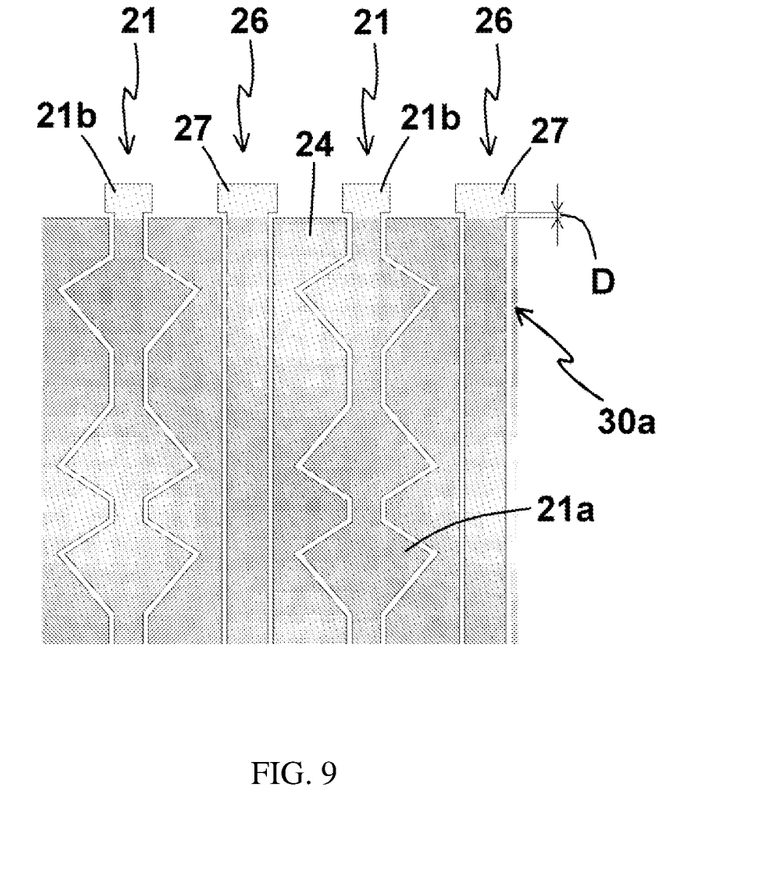
FIG. 9 is an enlarged view of part C in FIG. 8.
Figure 10:
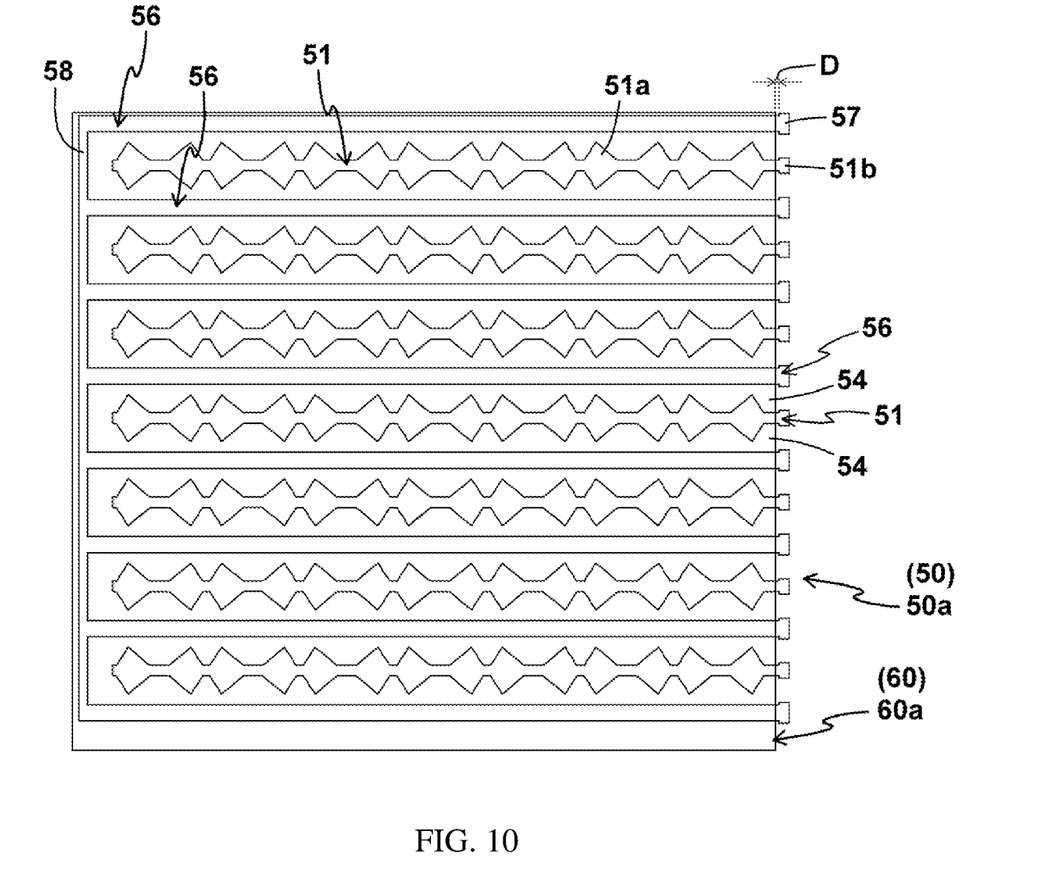
FIG. 10 is a plan view of the second auxiliary conductive layer superposed on the second sensing layer of the invention.

Please refer to FIGS. 2, 3 and 10. The second sensing layer 50 (i.e., X-axis sensing layer) is an ITO (indium tin oxide) conductive film and has second capacitive sensing columns (i.e., X-axis sensing columns) 51, second insulative columns 54 and second electromagnetic antenna columns (i.e., X-axis electromagnetic antenna columns) 56. Each of the second insulative columns 54 is arranged between one of the second capacitive sensing columns 51 and one of the second electromagnetic antenna columns 56 to form a second circuit pattern 50a. As shown in FIGS. 6 and 10, each of the second capacitive sensing columns 51 is composed of a string of diamond second capacitive sensing units 51a. A right end of each of the second capacitive sensing columns 51 is provided with a second capacitive signal contact 51*b*. A right end of each of the second electromagnetic antenna columns 56 is provided with a second electromagnetic signal contact 57 and a left end of each of the second electromagnetic antenna columns 56 is connected to a second connecting wire 58. The second connecting wires 58 electrically connect each of the second electromagnetic antenna columns 56 in series. The second circuit pattern 50*a* is located in the visible area 11*a*, and the second capacitive signal contacts 51*b*, the second electromagnetic signal contacts 57 and the second connecting wires 58 are located in the shaded area 11*b*.

The second auxiliary conductive layer 60 is a metal mesh layer and has a second mirroring pattern 60*a* substantially identical to the second circuit pattern 50*a* except the second electromagnetic signal contacts 51*b* and the second electromagnetic signal contacts 57. The second mirroring pattern 60*a* is correspondingly electrically connected to the second circuit pattern 50*a*. A gap D is formed between each second capacitive signal contact 51*b* and a corresponding one of the second electromagnetic signal contacts 57. Preferably, a width of the gap D is above 200 μm. When the second auxiliary conductive layer 60 is connected onto the second sensing layer 50, the gaps D makes edges of the second auxiliary conductive layer 60 be out of contact with both the second capacitive signal contacts 51*b* and the second electromagnetic signal contacts 57.

Please refer back to FIG. 1. The first auxiliary conductive layer 30 is electrically connected to the first sensing layer 20, the second auxiliary conductive layer 60 is electrically connected to the second sensing layer 50, and the transparent insulative layer 40 is sandwiched between the first sensing layer 20 and the second sensing layer 50 so that the first sensing layer 20 can be isolated from the second sensing layer 50. The insulative layer 40 may be made of solid optically clear adhesive (OCA) or liquid optical clear resin (OCR) so as to insulate and bond the two sensing layers 20, 50. As shown in FIGS. 2 and 3, the first capacitive sensing columns 21 are orthogonal to the second capacitive sensing column 51 when the two sensing layers 20, 50 have been assembled so as to make the first and second capacitive sensing units 21*a*, 51*a* arranged in an B interlaced and complementary manner to constitute a rectangular-lattice-shaped array of diamond-shaped capacitive sensing units. The first electromagnetic antenna columns 26 are orthogonal to the second electromagnetic antenna columns 56 to constitute a rectangular-lattice-shaped electromagnetic antenna array. The first capacitive signal contacts 21*b* on the first sensing layer 20, the second capacitive signal contacts 51*b* on the second sensing layer 50, the first electromagnetic signal contacts 27 and the second electromagnetic signal contacts 57 are arranged within the shaded area 11*b* and they can be separately connected to a signal processor (not shown) through the signal wires 25, 55.

According to the above description, the invention adopts ITO conductive films as a main part of sensing and cooperates with a metal mesh conductive material as auxiliary conductive layers to combine a capacitive touch sensor and an electromagnetic touch sensor to form a transparent touch sensor structure with double touch sensing modes, which may be mounted in front of a display. The invention further divides the two ITO conductive films as the first and second sensing layers 20, 50 into multiple capacitive sensing columns and insulative columns, most of the conductive material of the ITO conductive films is remained except a small part which is removed to form insulation, so the scraped area of each ITO conductive film only occupies a small portion so as to improve evenness of transmittance of the sensing layers and overcome the problem of interference to images shown on a display. In addition, the two auxiliary conductive layers 30, 60 are made of a metal mesh material with high conductivity, and the metal mesh material is made by woven tiny metal wires (such as silver nanowires) to form a mesh sheet with high transmittance of hollowing rate of above 95%. Because the metal mesh material of the auxiliary conductive layers 30, 60 is lower than the ITO films used by the sensing layers 20, 50 in impedance, the transmission efficiency of touch signals from the capacitive sensing columns 21, 51 and the electromagnetic sensing columns 26, 56 can be increased and attenuation in transmission of touch signals can also be reduced when the auxiliary conductive layers 30, 60 are electrically connected to the sensing layers 20, 50. As a result, transmission quality of touch signals is improved to be advantageous to design and application of large-sized touch panels, and the number of touch sensing layers can be decreased and overall thickness of the touch panel can be reduced to save costs of material. Further, the metal mesh conductive material with high transmittance is composed of nanometer wires which is invisible to the naked eye even if they are not transparent, so it would not impair visibility of a whole touch sensor when it is put in the visible area 11*a*. Besides, the metal mesh conductive material is electrically connected onto an ITO conductive film, so even if either of the both malfunctions, signals can be transmitted through the other one. As a result, a high yield rate in manufacture can be guaranteed and product life can be extended. That is, the invention possesses several advantages.

Figure 11:
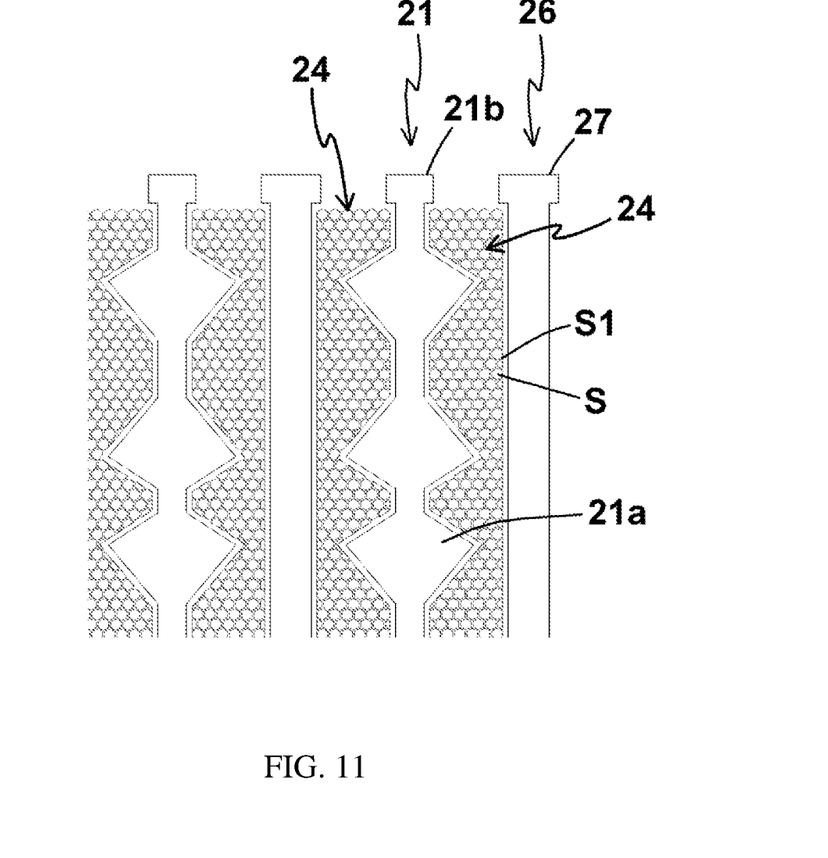
FIG. 11 is an enlarged view of part A in FIG. 4, which shows the first insulative column arranged in multiple tiny areas.

Please refer to FIG. 11. In another embodiment, the conductive material of the first and second insulative columns 24, 54 are shaped into multiple disconnected small areas S. An insulative gap S1 is formed between two adjacent small areas S. A width of the insulative gap S1 is above 50 μm and a depth thereof can totally cut off the conductive material of the first and second sensing layers 20, 50. The small areas S may be a hexagon, triangle, rectangle, trapezoid, strip, polygon, circle or any combination thereof in shape. By arrangement of the small areas S, both flatness and evenness of transmittance of the two sensing layers 20, 50 can be improved and noise capacitance can be reduced to obtain a better electric property.

What is claimed is:

1. A composite transparent touch panel comprising:
 a base layer, having a colored bezel on a periphery of a side thereof, and the colored bezel defining a shaded area and a visible area surrounded by the shaded area;
 a first sensing layer, having first capacitive sensing columns and first electromagnetic antenna columns, the first capacitive sensing columns and the first electromagnetic antenna columns being arranged along a first direction and separately insulatively interlaced with each other to form a first circuit pattern, a first end of each of the first capacitive sensing columns being provided with a corresponding one first capacitive signal contact, a first end of each of the first electromagnetic antenna columns being provided with a corresponding one first electromagnetic signal contact, second ends of the first electromagnetic antenna columns being connected to a first connecting wire, the first connecting wire electrically connecting the second ends of the first electromagnetic antenna columns in series, the first circuit pattern being located in the visible area, and the first capacitive signal contacts, the first electromagnetic signal contacts and the first connecting wire are located in the shaded area;

a first auxiliary conductive layer, having a first mirroring pattern substantially identical to the first circuit pattern except the first capacitive signal contacts and the first electromagnetic signal contacts so as to make the first mirroring pattern correspondingly electrically connect to the first circuit pattern, and a first gap being formed between each first capacitive signal contact and a corresponding one of the first electromagnetic signal contacts;

a second sensing layer, having second capacitive sensing columns and second electromagnetic antenna columns, the second capacitive sensing columns and the second electromagnetic antenna columns being arranged along a second direction and separately insulatively interlaced with each other to form a second circuit pattern, a first end of each of the second capacitive sensing columns being provided with a second capacitive signal contact, a first end of each of the second electromagnetic antenna columns being provided with a second electromagnetic signal contact, second ends of the second electromagnetic antenna columns being connected to a second connecting wire, the second connecting wire electrically connecting the second ends of the second electromagnetic antenna columns in series, the second circuit pattern being located in the visible area, and the second capacitive signal contacts, the second electromagnetic signal contacts and the second connecting wire are located in the shaded area;

a second auxiliary conductive layer, having a second mirroring pattern substantially identical to the second circuit pattern except the second capacitive signal contacts and the second electromagnetic signal contacts so as to make the second mirroring pattern correspondingly electrically connect to the second circuit pattern, and a second gap being formed between each second capacitive signal contact and a corresponding one of the second electromagnetic signal contacts; and an insulative layer disposed between the first sensing layer and the second sensing layer;

wherein the first direction is orthogonal to the second direction, the first capacitive sensing columns are orthogonal to the second capacitive sensing columns to constitute a rectangular-lattice-shaped array of diamond-shaped capacitive sensing units, and the first electromagnetic antenna columns to constitute a rectangular-lattice-shaped electromagnetic antenna array.

2. The touch panel of claim 1, wherein each of the first and second sensing layers is formed by a metal oxide film made of indium tin oxide, indium zinc oxide, aluminum zinc oxide or antimony tin oxide.

3. The touch panel of claim 1, wherein each of the first and second auxiliary layers is formed by a metal mesh or graphene film.

4. The touch panel of claim 3, wherein the metal mesh is woven by metal wires made of gold, silver, copper, aluminum, molybdenum or nickel.

5. The touch panel of claim 1, wherein a width of each of the first and second gaps is above 200 μm.

6. The touch panel of claim 1, wherein the first circuit pattern further comprises a first insulative column between each first capacitive sensing column and a corresponding one of the first electromagnetic antenna columns, and the second circuit pattern further comprises a second insulative column between each second capacitive sensing column and a corresponding one of the second electromagnetic antenna columns.

7. The touch panel of claim 6, wherein the first and second insulative columns are separately shaped into multiple disconnected areas made of a conductive material.

8. The touch panel of claim 1, wherein the insulative layer is made of solid optically clear adhesive (OCA) or liquid optical clear resin (OCR).

* * * * *